United States Patent
Lee et al.

(10) Patent No.: US 8,373,877 B2
(45) Date of Patent: Feb. 12, 2013

(54) IMAGE FORMING APPARATUS, AND HOST DEVICE AND DIRECT-PRINT CONTROL METHOD OF HOST DEVICE

(75) Inventors: Sang-min Lee, Suwon-si (KR); Sa-bong Jeong, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 1367 days.

(21) Appl. No.: 11/970,649

(22) Filed: Jan. 8, 2008

(65) Prior Publication Data

US 2008/0172395 A1 Jul. 17, 2008

(30) Foreign Application Priority Data

Jan. 11, 2007 (KR) .................. 10-2007-0003410

(51) Int. Cl.
G06F 3/12 (2006.01)
G06K 15/00 (2006.01)
H04N 5/225 (2006.01)

(52) U.S. Cl. ...... 358/1.15; 358/1.1; 358/1.16; 358/1.18; 348/207.1

(58) Field of Classification Search ........ 358/1.11–1.18; 348/207.1, 207.2
See application file for complete search history.

(56) References Cited

U.S. PATENT DOCUMENTS

| | | | |
|---|---|---|---|
| 6,914,698 B1 * | 7/2005 | Hunter | 358/1.18 |
| 6,947,163 B2 * | 9/2005 | Takemura | 358/1.15 |
| 7,139,095 B1 * | 11/2006 | Hunter | 358/1.18 |
| 7,199,895 B2 * | 4/2007 | Collier et al. | 358/1.15 |
| 7,224,480 B2 * | 5/2007 | Tanaka et al. | 358/1.15 |
| 7,312,817 B2 * | 12/2007 | Schinner | 348/207.2 |
| 7,359,080 B2 * | 4/2008 | Takemura | 358/1.15 |
| 7,430,054 B2 * | 9/2008 | Masumoto et al. | 358/1.14 |
| 7,511,850 B2 * | 3/2009 | Ikeda | 358/1.16 |
| 7,593,035 B2 * | 9/2009 | Okamoto | 348/207.1 |
| 7,605,936 B2 * | 10/2009 | Uchida et al. | 358/1.15 |
| 7,706,009 B2 * | 4/2010 | Oka | 358/1.15 |
| 7,907,291 B2 * | 3/2011 | Ishii et al. | 358/1.13 |
| 2002/0131066 A1 * | 9/2002 | Young | 358/1.13 |
| 2004/0004739 A1 * | 1/2004 | Koike et al. | 358/1.16 |
| 2004/0095469 A1 * | 5/2004 | Lin | 348/207.2 |
| 2004/0196484 A1 * | 10/2004 | Masumoto et al. | 358/1.13 |

(Continued)

FOREIGN PATENT DOCUMENTS

| | | |
|---|---|---|
| CA | 2 462 521 | 5/2003 |
| EP | 1 448 396 | 8/2004 |

(Continued)

OTHER PUBLICATIONS

Chinese Office Action issued Jan. 26, 2011 for CN Patent Application No. 200810095146.3.

(Continued)

*Primary Examiner* — Satwant Singh
(74) *Attorney, Agent, or Firm* — Stanzione & Kim, LLP

(57) ABSTRACT

A host device includes an interface part to receive directly-printable file types from an image forming apparatus; and a controller to provide a popup menu to set a direct print option, if a file corresponding to the received file types is selected from among previously stored files. Accordingly, whether or not it is possible to perform direct-printing of a file which a user desires to print may be displayed, and thus direct-printing can be performed without individually checking whether each file is a directly-printable file type.

20 Claims, 4 Drawing Sheets

U.S. PATENT DOCUMENTS

| | | | |
|---|---|---|---|
| 2004/0207874 A1* | 10/2004 | Chiang | 358/1.16 |
| 2005/0007626 A1* | 1/2005 | Takaiwa | 358/1.15 |
| 2005/0254079 A1* | 11/2005 | Han | 358/1.13 |
| 2005/0254089 A1* | 11/2005 | Oliver et al. | 358/1.16 |
| 2005/0259293 A1* | 11/2005 | Yoon | 358/1.15 |
| 2005/0280844 A1* | 12/2005 | Ferlitsch | 358/1.9 |
| 2006/0007485 A1* | 1/2006 | Miyazaki | 358/1.15 |
| 2006/0023237 A1* | 2/2006 | Endo | 358/1.13 |
| 2006/0039020 A1* | 2/2006 | Sasaki | 358/1.13 |
| 2006/0092457 A1* | 5/2006 | Rhim et al. | 358/1.15 |
| 2006/0279636 A1* | 12/2006 | Sasaki | 348/207.2 |
| 2007/0064253 A1* | 3/2007 | Yang | 358/1.13 |
| 2007/0201048 A1* | 8/2007 | DuBois | 358/1.1 |
| 2007/0236717 A1* | 10/2007 | Nishikawa | 358/1.13 |
| 2008/0049249 A1* | 2/2008 | Tomita | 358/1.15 |
| 2008/0144104 A1* | 6/2008 | Do | 358/1.16 |
| 2008/0309961 A1 | 12/2008 | Aichi et al. | |
| 2009/0207254 A1* | 8/2009 | Tomat et al. | 348/207.1 |

FOREIGN PATENT DOCUMENTS

| | | |
|---|---|---|
| JP | 2004-46868 | 2/2004 |
| JP | 2005-161556 | 6/2005 |
| JP | 2006-067368 | 3/2006 |
| KR | 1020020001977 | 1/2002 |
| KR | 1020040049868 | 6/2004 |

OTHER PUBLICATIONS

Korean Office Action issued Dec. 14, 2012 in KR Application No. 10-2007-0003410.

* cited by examiner

IMAGE FORMING APPARATUS, AND HOST DEVICE AND DIRECT-PRINT CONTROL METHOD OF HOST DEVICE

CROSS-REFERENCE TO RELATED APPLICATIONS

This application claims priority under 35 U.S.C. §119 (a) from Korean Patent Application No. 2007-3410, filed Jan. 11, 2007, in the Korean Intellectual Property Office, the disclosure of which is incorporated herein by reference in its entirety.

BACKGROUND OF THE INVENTION

1. Field of the Invention

The present general inventive concept relates to an image forming apparatus, and a host device connected to the image forming apparatus, and a direct-print control method of the host device. More particularly, the present general inventive concept relates to an image forming apparatus connected to a host device to transmit one or more directly-printable file types to the host device, and a host device and a method thereof in which a direct print option menu of a matching file is provided using the file types received from the image forming apparatus.

2. Description of the Related Art

Printers which support a direct-print function for PDF, TIFF, JPG or other format files have recently become widely used.

The direct-print function means that printing is directly performed only by transmitting files to a printer without executing a separate application program on a host device, such as a personal computer (PC), a notebook personal computer (PC), a digital camera, or the like. When such a direct-print function is supported, there is no need for a separate printer driver, thereby enhancing user convenience.

Direct-printing enables a printer to print bitmap data when the file is directly transmitted to the printer, without the use of a printer driver and an interpreter of the printer converting the transferred file into bitmap data. Accordingly, it is possible to print a file which a user desires to print without a request for the file from the application program.

However, in the host device, whether direct-printing is possible in the printer or not is determined after printing is performed or after a user checks printer requirements, and thus the user experiences inconvenience.

Various directly-printable types of files may be set according to the printer requirements. Accordingly, when a plurality of printers is connected, the user may need to check the requirements of each printer or individually check which files are directly-printable through the printing operation, thus causing user inconvenience.

SUMMARY OF THE INVENTION

The present general inventive concept provides an image forming apparatus to transmit one or more directly-printable file types, and a host device and a method thereof in which a direct print option menu of a matching file is provided using the file types received from the image forming apparatus, increasing user convenience.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a host device including an interface part to receive directly-printable file types from an image forming apparatus, and a controller to provide a popup menu to set a direct print option, if a file corresponding to the received file types is selected from among previously stored files.

The host device may further include a storage part to store the directly-printable file types. The controller may transmit a request signal requesting transmission of the file types to the image forming apparatus connected to the host device, and store the file types received in response to the request signal in the storage part, if the connection to the image forming apparatus is detected.

The host device may further include a popup menu generator to generate the popup menu; and a display part to display the generated popup menu. If a file corresponding to the stored file types is selected from among the previously stored files, the controller may control the popup menu generator and display part to add the direct print option to a default popup menu for the selected file and to display the popup menu comprising the direct print option.

The popup menu may include a direct print option menu to set direct-printing, and a sub-menu indicating a list of image forming apparatuses capable of directly printing the selected file.

The controller may provide a sub-menu indicating a list of image forming apparatuses capable of directly printing the selected file, if the direct print option is selected from the popup menu.

The host device may further include an input part to set the direct print option through the popup menu; and an option setting part to set print options of the selected file. The controller may transmit a file for which the direct print option is set, together with the set print options to, the image forming apparatus.

The print options may include a command generated in Printer Job Language (PJL).

The controller may delete the stored file types and the direct print option, if the connection to the image forming apparatus is released.

The file types may comprise at least one selected from among JPG, BMP, PRN, XPS, and HTML.

The controller may transmit the selected file to the image forming apparatus through the interface part without the use of a printer driver.

The popup menu may be one of a right-click menu and a shortcut menu.

The foregoing and/or other aspects and utilities of the present general inventive concept may be achieved by providing an image forming apparatus including an interface part which is connected to a host device, a storage part to store the directly-printable file types, a controller to generate data in which the stored file types are recorded and to transmit the data to the host device, if transmission of the file types is requested by the host device, a converter to convert the received file into printable data, if a file corresponding to the transmitted file types is received from the host device, and a printing part to print the converted data.

The foregoing and/or other aspects and utilities of the present general inventive concept may be achieved by providing an image forming apparatus including a storage part to store directly-printable file types, a controller to output data corresponding to the stored directly-printable file types to an external host device, and to receive a file corresponding to the output data from the external host device; and a printing part to print the received file.

The foregoing and/or other aspects and utilities of the present general inventive concept may also be achieved by providing a direct-print control method of a host device connected to an image forming apparatus capable of direct-printing, the method including receiving the directly-printable file types from the image forming apparatus, if the connection to the image forming apparatus is detected, providing a popup menu to set a direct print option, if a file corresponding to the received file types is selected from among previously stored files, and transmitting the selected file to the image forming apparatuses connected to the host device, if the direct print option is selected.

The providing the popup menu may include adding the direct print option to a default popup menu for the selected file, if a file corresponding to the received file types is selected from among the previously stored files; and displaying the popup menu comprising the direct print option.

The popup menu may include a direct print option menu to set direct-printing, and a sub-menu indicating a list of image forming apparatuses capable of directly printing the selected file.

The transmitting of the selected file may include providing a sub-menu indicating a list of image forming apparatuses capable of directly printing the selected file, if the direct print option is selected from the popup menu, and transmitting the selected file to an image forming apparatus if one image forming apparatus is selected on the sub-menu.

The transmitting of the selected file may include setting the direct print option through the popup menu, setting print options of the selected file, and transmitting a file for which the direct print option is set, together with the set print options to, the image forming apparatus connected to the host device.

The print options may include a command generated in Printer Job Language (PJL).

The method may further include deleting the stored file types and the direct print option, if the connection to the image forming apparatus is released.

The file types may include at least one selected from among JPG, BMP, PRN, XPS, and HTML.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
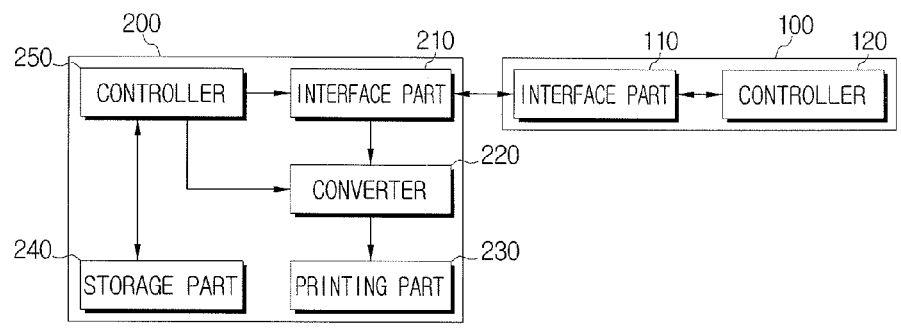
FIG. 1 is a block diagram illustrating an image forming system having a host device and an image forming apparatus according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram illustrating an image forming system having a host device 100 and an image forming apparatus 200 according to an exemplary embodiment of the present general inventive concept. In FIG. 1, the host device 100 according to an exemplary embodiment of the present general inventive concept includes an interface part 110 and a controller 120. The image forming apparatus 200 connected to the host device 100 includes an interface part 210, a converter 220, a printing part 230, a storage part 240, and a controller 250. Hereinafter, for convenience of description, interface parts and controllers of the image forming system will be separately referred to as the first interface part 110 and second interface part 210, and the first controller 120 and second controller 250.

The first interface part 110 is an interface to connect the host device 100 to the image forming apparatus 200, and can receive and transmit data to and from the second interface part 210 of the image forming apparatus 200. Here, the interface can be connected through a wired or wireless connection, for example, USB ports or using a local area network (LAN) and the Internet network. In the exemplary embodiment of the present general inventive concept, the first interface part 110 can receive one or more directly-printable file types from the image forming apparatus 200.

The file types may include JPG, BMP, PRN, XPS, HTML, or the like.

When a file corresponding to at least one of the file types received through the first interface part 110 is selected from among previously stored files, the first controller 120 can provide a popup menu to set a direct print option. The popup menu may be a menu window which pops up when clicked on a button of an input device, for example, the right button of a mouse. If the direct print option is selected, the first controller 120 can transmit the selected file to the image forming apparatus 200. Accordingly, when the file stored in the host device 100 is printed, the popup menu of the directly-printable file is provided, and thus it is possible to simply input a print command.

The storage part 240 of the image forming apparatus 200 can store the directly-printable file types.

If transmission of the directly-printable file types is requested by the host device 100, the second controller 250 can generate data in which the file types stored in the storage part 240 are recorded, and transmit the data to the host device 100.

If the directly-printable file is received from the host device 100, the converter 220 can convert the received file into printable data, such as printable bitmap data. The converter 220 may be an interpreter to interpret the received file.

The printing part 230 can receive the data converted by the converter 220 and print the data.

Figure 2:
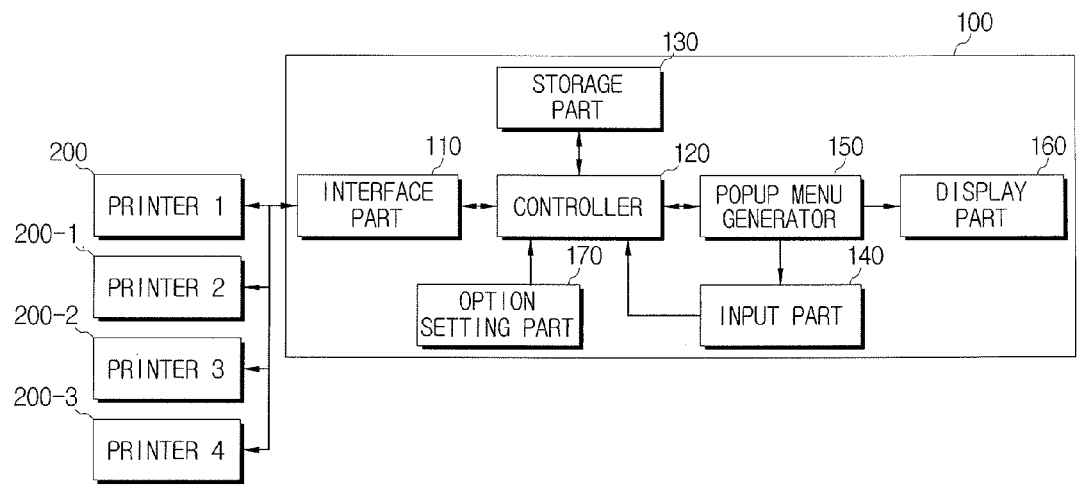
FIG. 2 is a detailed block diagram illustrating the host device of FIG. 1.

FIG. 2 is a detailed block diagram illustrating the host device 100 of FIG. 1. Referring to FIGS. 1 and 2, the host device 100 further includes a storage part 130, an input part 140, a popup menu generator 150, a display part 160, and an option setting part 170, in addition to the interface part 110 and controller 120 of FIG. 1. The first interface part 110 enables the host device 100 to be connected to one or more image forming apparatuses, such as first, second, third, and fourth printers 200, 200-1, 200-2, and 200-3. In this case, the host device 10 is physically or electronically connected to the printers 200, 200-1, 200-2, and 200-3. Accordingly, when the image forming apparatuses are switched ON, the image forming apparatuses are connected in a software manner, and thus the first interface part 110 can perform bidirectional communication between the image forming apparatus and host device 100.

The storage part 130 (hereinafter, is referred to as "first storage part") can store the directly-printable file types which are received by the first interface part 110.

If the connection to the image forming apparatus is detected, the first controller 120 can transmit a request signal requesting transmission of the file types to the image forming apparatus connected to the host device 100, and store the file types received in response to the request signal in the first storage part 130.

Specifically, the first controller 120 can transmit a request signal to request transmission of the directly-printable file types to printers 200, 200-1, 200-2, and 200-3, which are connected in a software manner, and/or which are physically or electronically connected by the first interface part 110. For example, if the first, second, and third printers 200, 200-1, and 200-2 are connected in a software manner, the first controller 200 can transmit a request signal to the first, second, and third printers 200, 200-1, and 200-2 and store the file types received from each printer 200, 200-1, 200-2, or 200-3 in the first storage part 130 for each printer 200, 200-1, 200-2, or 200-3.

The file types are received in a form of data in which at least one file type name is recorded. The first controller 120 can read the received data and read out the file type name. Additionally, the first controller 120 can store the name of the image forming apparatus along with a matching file type name in the first storage part 130.

In addition, the first storage part 130 can store a document file and an image file prepared by various application programs. The application program may include a word program, an excel program, an image generation program, and a program generated using a printer driver of the host device 100. The files generated using each application program may have a file name extension, such as XPS, TIFF, JPG, BMP, PRN, or other name extensions.

The input part 140 may be a mouse.

If a file is selected using the right button of the mouse, the first controller 120 can provide a default popup menu to set one or more basic options of the file. The basic options provided from the default popup menu may be set differently according to the application programs of each file.

The popup menu generator 150 can generate a popup menu.

The display part 160 can display the popup menu generated by the popup menu generator 150. The display part 160 may be an external display unit connectable to the host device 100 to receive a signal corresponding to the popup menu from the popup menu generator 150 and to display the popup menu corresponding to the received signal on its screen.

If a file corresponding to the directly-printable file types is selected from among the stored files, the first controller 120 can control the popup menu generator 150 and the display part 160 to add a direct print option to a default popup menu for the selected file and to display the default popup menu having the direct print option.

Additionally, if the direct print option is selected from the popup menu by the input part 140, the first controller 120 can control the popup menu generator 150 and the display part 160 to generate a sub-menu indicating a list of image forming apparatuses capable of directly printing the selected file and to display the list. The popup menu will be described in detail with reference to FIG. 3.

Figure 3:
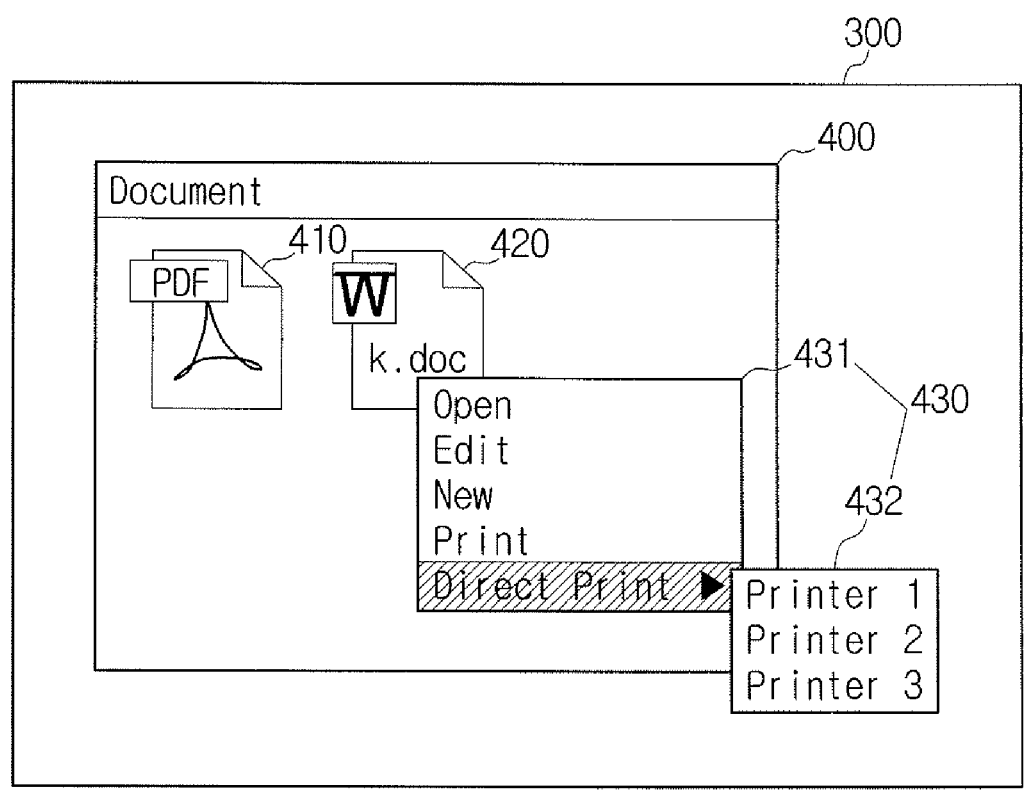
FIG. 3 is an exemplary view illustrating a popup menu according to an exemplary embodiment of the present general inventive concept.

FIG. 3 is an exemplary view illustrating a popup menu 430 according to an exemplary embodiment of the present general inventive concept.

In FIG. 3, a Document 400 including a PDF file 410 and a word file 420 is displayed on a screen 300 of the display part 160. The word file 420 is selected from among the files and a popup menu 430 is displayed.

If it is detected that the first to third printers among the first to fourth printers 200 to 200-3 of FIG. 2 are connected in a software manner, and the file types that are directly-printable by each printer include XPS, the popup menu 430 may include a default popup menu 431 having a direct print option menu of the selected word file 420.

If the direct print option menu is selected from the default popup menu 431, a sub-menu 432 indicating a list of image forming apparatuses capable of directly printing the word file 420 can be displayed.

When one image forming apparatus is selected from the list displayed on the sub-menu 432, the word file 420 can be transmitted to the selected image forming apparatus.

The option setting part 170 can set print options for the selected file. The print options, as a command generated in Printer Job Language (PJL), may be a command to set the number of sheets of printing paper. The options can be set before the direct print option is selected from the popup menu, or the number of sheets of printing paper can be set using a separate option setting window (not illustrated) which pops up to be displayed on the display part 160 after the direct print option is selected.

If the print options are set, the first controller 120 can transmit the file for which the print options are set and the direct print option is set, to the image forming apparatus.

If the image forming apparatus, which is not connected in a software manner to the image forming apparatuses, is detected, the first controller 120 can delete the file types corresponding to the detected image forming apparatus from the storage part 130.

Figure 4:
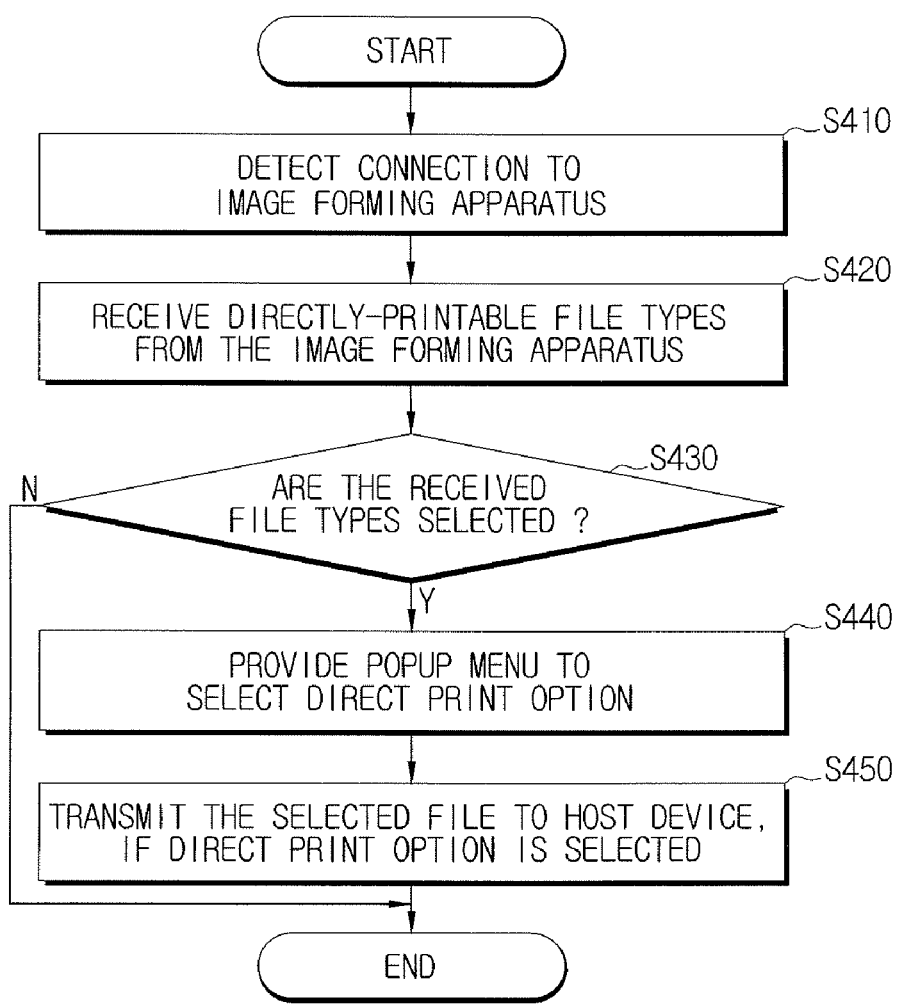
FIG. 4 is a flowchart illustrating a direct-print control method of an image forming apparatus according to another exemplary embodiment of the present general inventive concept.

FIG. 4 is a flowchart illustrating a direct-print control method of an image forming apparatus according to another exemplary embodiment of the present general inventive concept. In FIG. 4, if connection to an image forming apparatus is detected in operation S410, one or more directly-printable file types can be received from the image forming apparatus connected to a host device in operation S420. The file types may include JPG, BMP, PRN, XPS, HTML, or the like.

If a file corresponding to the received file types is selected from among previously stored files in operation S430, a popup menu to set a direct print option for the selected file can be provided in operation S440. If the direct print option is selected from the provided popup menu, the selected file can be transmitted to the host device connected to the image forming apparatus in operation S450. Accordingly, it is possible to print the selected file merely by transmitting the selected file without executing the application program and driver program of the selected file.

Figure 5:
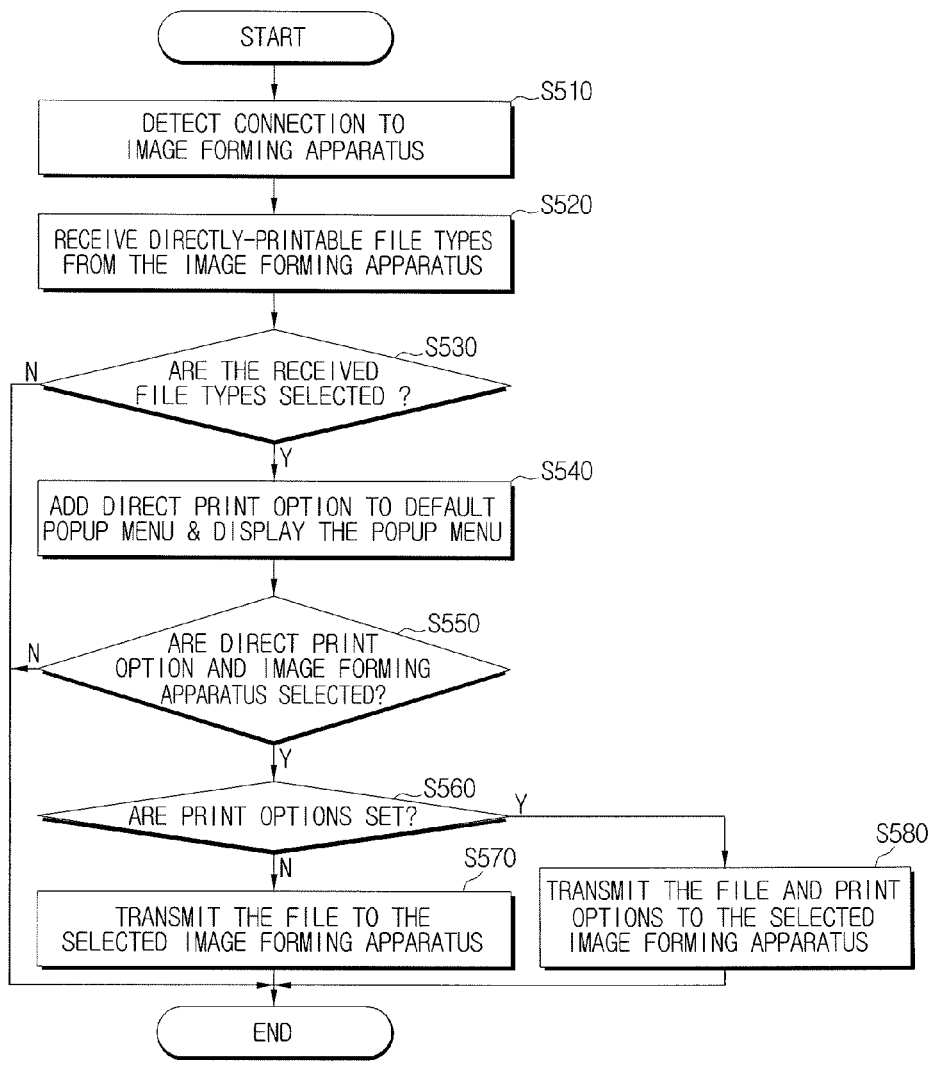
FIG. 5 is a flowchart illustrating the method of FIG. 4.

FIG. 5 is a flowchart illustrating the method of FIG. 4. In FIG. 5, if it is detected that a plurality of image forming apparatuses are connected in a software manner in operation S510, a request signal requesting transmission of the directly-printable file types can be transmitted to each image forming apparatus and the directly-printable file types can be received in operation S520. The received file types can be stored for each image forming apparatus.

If a file corresponding to the received file types is selected in operation S530, a direct print option can be added to a default popup menu for the selected file, and the popup menu comprising the direct print option can be displayed in operation S540. If the displayed direct print option is selected, a sub-menu can be displayed so that the image forming apparatus capable of performing direct-printing can be selected.

Next, if the direct print option and the image forming apparatus are selected in operation S550, whether print options are set or not can be checked in operation S560. The print options may include a command which is generated in Printer Job Language (PJL) to set the number of sheets of printing paper. The print options can be set before or after the operation S550 is performed.

If the print options are set, the file to be printed and print options for the file can be transmitted to the image forming apparatus selected from the sub-menu in operation S580, and alternatively, if the print options are not set, the file to be printed can be transmitted to the selected image forming apparatus in operation S570.

If an image forming apparatus that is not connected to the image forming apparatuses in a software manner is detected, a matching file type of the image forming apparatus can be deleted.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

The exemplary embodiments described above relate to the image forming apparatus, which is connected to the host device, to transmit the directly-printable file types to the host device, and the host device and the method thereof in which the direct print option menu of the matching file is provided using the file types received from the image forming apparatus. Accordingly, whether it is possible to perform direct-printing for a file which a user desires to print or not is displayed, and thus direct-printing can be performed without individually checking whether the file types are directly-printable.

As described above, according to the exemplary embodiments of the present general inventive concept, the directly-printable file types can be received from the image forming apparatus connected to the host device, and the direct print option menu for the matching file can be provided, even though whether a file to be printed is a directly-printable file or not is not checked individually. Therefore, direct-printing can be performed through simple manipulation, and thus user convenience can be improved.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A host device comprising:
    an interface part to receive, from an image forming apparatus, one or more directly-printable file types that indicate file types that are directly printable by the image forming apparatus;
    a display part to display a popup menu to set a direct print option if a file corresponding to the received file types is selected from among previously stored files;
    an input part to set the direct print option through the popup menu;
    a controller to control the interface part to transmit the selected file for which the direct print option is set to the image forming apparatus; and
    a popup menu generator to generate the popup menu,
    wherein, if a file corresponding to the stored file types is selected from among the previously stored files, the controller controls the popup menu generator and display part to add the direct print option to a default popup menu for the selected file and to display the popup menu comprising the direct print option.

2. The host device of claim 1, further comprising:
    a storage part to store the directly-printable file types,
    wherein the controller controls the interface part to transmit a request signal requesting transmission of the file types to the image forming apparatus connected to the host device, and stores the file types received in response to the request signal in the storage part if the connection to the image forming apparatus is detected.

3. The host device of claim 2, wherein the controller deletes the stored file types and the direct print option if the connection to the image forming apparatus is released.

4. The host device of claim 1, wherein the popup menu comprises a direct print option menu to set direct-printing, and a sub-menu indicating a list of image forming apparatuses capable of directly printing the selected file.

5. The host device of claim 1, wherein the controller controls the display part to provide a sub-menu indicating a list of image forming apparatuses capable of directly printing the selected file if the direct print option is selected from the popup menu.

6. The host device of claim 1, further comprising:
    an option setting part to set print options of the selected file,
    wherein the controller controls the interface part to transmit a file for which the direct print option is set, together with the set print options, to the image forming apparatus.

7. The host device of claim 6, wherein the print options comprise a command generated in Printer Job Language (PJL).

8. The host device of claim 1, wherein the file types comprise at least one selected from among JPG, BMP, PRN, XPS, and HTML.

9. The host device of claim 1, wherein the controller transmits the selected file to the image forming apparatus through the interface part without the use of a printer driver.

10. The host device of claim 1, wherein the popup menu is one of a right-click menu and a shortcut menu.

11. An image forming apparatus comprising:
    an interface part connected to a host device, the host device comprising:
        a host controller to control a host interface part;
        a popup menu generator to generate a popup menu; and a display part to display the popup menu, the image forming apparatus further comprising:

a storage part to store directly-printable file types;

a controller to generate data corresponding to the stored directly-printable file types that indicates file types that are directly printable by the image forming apparatus and to transmit the data to the host device if transmission of the file types is requested by the host device;

a converter to convert a received file into printable data if the received file corresponds to a file type of the transmitted file types received from the host device; and a printing part to print the converted data, wherein the host controller controls the popup menu generator and display part to add a direct print option to a default popup menu for the received file and to display the popup menu comprising the direct print option.

12. An image forming apparatus comprising:

a storage part to store directly-printable file types; and a controller to output data corresponding to the stored directly-printable file types, and that indicates file types that are directly printable by the image forming apparatus, to an external host device, and to receive a file corresponding to the output data from the external host device, the host device comprising:

a host controller to control a host interface part;

a popup menu generator to generate a popup menu; and a display part to display the popup menu, the image forming apparatus further comprising:

a printing part to print the received file, wherein the host controller controls the popup menu generator and display part to add a direct print option to a default popup menu for the received file and to display the popup menu comprising the direct print option.

13. A direct-print control method of a host device connected to an image forming apparatus capable of direct-printing, the method comprising:

receiving directly-printable file types indicative of file types that are directly printable by the image forming apparatus from the image forming apparatus if the connection to the image forming apparatus is detected;

providing a popup menu to set a direct print option if a file corresponding to the received directly-printable file types is selected from among previously stored files; and transmitting the selected file to the image forming apparatuses connected to the host device if the direct print option is set, wherein the providing of the popup menu comprises:

adding the direct print option to a default popup menu for the selected file if the file corresponding to the received directly-printable file types is selected from among the previously stored files; and displaying the popup menu comprising the direct print option.

14. The method of claim 13, wherein the popup menu comprises a direct print option menu to set direct-printing, and a sub-menu indicating a list of image forming apparatuses capable of directly printing the selected file.

15. The method of claim 13, wherein the transmitting of the selected file comprises:

providing a sub-menu indicating a list of image forming apparatuses capable of directly printing the selected file if the direct print option is selected from the popup menu; and transmitting the selected file to an image forming apparatus if one image forming apparatus is selected on the sub-menu.

16. The method of claim 13, wherein the transmitting of the selected file comprises:

setting the direct print option through the popup menu;

setting print options of the selected file; and transmitting a file for which the direct print option is set, together with the set print options, to the image forming apparatus connected to the host device.

17. The method of claim 16, wherein the print options comprise a command generated in Printer Job Language (PJL).

18. The method of claim 13, further comprising:

deleting the stored file types and the direct print option if the connection to the image forming apparatus is released.

19. The method of claim 13, wherein the file types comprise at least one selected from among JPG, BMP, PRN, XPS, and HTML.

20. A direct-print control method comprising:

connecting a host device to an image forming apparatus having direct printing capabilities;

requesting the image forming apparatus to transmit directly-printable file types to the host device upon connection of the host device to the image forming apparatus, the directly-printable file types being indicative of file types directly printable by the image forming apparatus;

receiving the directly-printable file types from the image forming apparatus;

providing a popup menu to set a direct print option if a file corresponding to the received directly-printable file types is selected from among previously stored files;

permitting the selected file previously stored in the host device to be directly printed by the image forming apparatus if any of the received directly-printable file types correspond to the previously stored file; and directly printing the previously stored file by transmitting the previously stored file from the host device to the image forming apparatus upon determining that the previously stored file corresponds to any of the received directly-printable file types, wherein the providing of the popup menu comprises:

adding the direct print option to a default popup menu for the selected file if the file corresponding to the received directly-printable file types is selected from among the previously stored files; and displaying the popup menu comprising the direct print option.

* * * * *